(12) United States Patent
Wang et al.

(10) Patent No.: US 9,560,367 B2
(45) Date of Patent: Jan. 31, 2017

(54) PARAMETER SET AND PICTURE HEADER IN VIDEO CODING

(75) Inventors: Ye-Kui Wang, Tampere (FI); Miska Hannuksela, Ruutana (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1983 days.

(21) Appl. No.: 11/207,610

(22) Filed: Aug. 19, 2005

(65) Prior Publication Data

US 2006/0050793 A1    Mar. 9, 2006

Related U.S. Application Data

(60) Provisional application No. 60/607,334, filed on Sep. 3, 2004.

(51) Int. Cl.
| H04N 7/12 | (2006.01) |
| H04N 19/42 | (2014.01) |
| H04N 19/70 | (2014.01) |
| H04N 19/61 | (2014.01) |

(52) U.S. Cl.
CPC .............. *H04N 19/42* (2014.11); *H04N 19/61* (2014.11); *H04N 19/70* (2014.11)

(58) Field of Classification Search
CPC ......... H04N 19/42; H04N 19/61; H04N 19/70
USPC .................................................. 375/240.25
See application file for complete search history.

(56) References Cited

U.S. PATENT DOCUMENTS

| 5,121,205 | A | | 6/1992 | Ng et al. |
| 5,289,276 | A | * | 2/1994 | Siracusa et al. ............. 348/469 |
| 5,440,345 | A | * | 8/1995 | Shimoda ................... 375/240.14 |
| 5,802,213 | A | * | 9/1998 | Gardos ................ H04N 19/176 |
| | | | | 375/240.03 |
| 6,342,925 | B1 | | 1/2002 | Akhavan et al. |
| 6,795,498 | B1 | | 9/2004 | Kato et al. |
| 6,807,366 | B1 | | 10/2004 | Okubo et al. |
| 7,075,991 | B1 | * | 7/2006 | Kato ........................ 375/240.26 |

(Continued)

FOREIGN PATENT DOCUMENTS

| CN | 1274156 A | 11/2000 |
| CN | 1276690 A | 12/2000 |

(Continued)

OTHER PUBLICATIONS

International Telecommunication Union; "ITU-T Recommendation H.261; Line Transmission of Non-Telephone Signals; Video Codec for Audiovisual Services at px64 kbits"; Mar. 1993.

(Continued)

*Primary Examiner* — Nhon Diep
(74) *Attorney, Agent, or Firm* — Alston & Bird LLP

(57) ABSTRACT

In a start code based bistream structure for use in video coding, a picture header is used simultaneously with the parameter set in the start code. The picture header is present before the slice header in the same picture. As such, it is possible to allow the presence of at least one sequence parameter set or picture parameter set before the slice header. In a NAL unit parameter set bitstream structure, the picture head NAL unit is present before the slice NAL unit. In either structure, the picture header information must remain unchanged during the decoding of the entire picture, but should change more frequently between pictures as compared to the information in the picture parameter set.

20 Claims, 5 Drawing Sheets

(56) References Cited

U.S. PATENT DOCUMENTS

| | | | |
|---|---|---|---|
| 7,110,663 | B1 | 9/2006 | Tsukagoshi et al. |
| 7,415,069 | B2* | 8/2008 | Winger .................. 375/240.25 |
| 8,467,459 | B2* | 6/2013 | Yin ..................... H04N 19/70 375/240.12 |
| 2001/0040700 | A1 | 11/2001 | Hannuksela et al. |
| 2004/0032908 | A1 | 2/2004 | Hagai et al. |
| 2006/0013318 | A1* | 1/2006 | Webb et al. ............. 375/240.25 |
| 2008/0089597 | A1* | 4/2008 | Guo .................... H04N 19/30 382/238 |
| 2008/0232470 | A1* | 9/2008 | Park .................. H04N 21/2383 375/240.12 |
| 2009/0003441 | A1* | 1/2009 | Sekiguchi ............ H04N 19/176 375/240.13 |
| 2009/0177949 | A1* | 7/2009 | Lamy-Bergot ........ H04L 1/0057 714/784 |

FOREIGN PATENT DOCUMENTS

| | | |
|---|---|---|
| CN | 1314050 A | 9/2001 |
| EP | 0 920 202 A2 | 5/1999 |
| EP | 1385337 A1 | 1/2004 |
| EP | 1 589 760 A1 | 10/2005 |
| WO | WO 03/093928 A2 | 11/2003 |
| WO | WO 03093928 A2 | 11/2003 |
| WO | WO 2004/010699 A1 | 1/2004 |
| WO | WO 2004/066633 A1 | 8/2004 |

OTHER PUBLICATIONS

International Telecommunication Union; "ITU-T Recommendation H.263; Series H: Audiovisual and Multimedia Systems; Video Coding for Low Bit Rate Communication"; Jan. 2005.
International Telecommunication Union; "ITU-T Recommendation H.264; Series H: Audiovisual and Multimedia Systems; Advanced Video Coding for Generic Audiovisual Services"; May 2003.
IEEE Transactions on Circuits and Systems for Video Technology, vol. 13, No. 7; IEEE 1051-8215/03; T. Weigand et al.; "Overview of the H.264/AVC Video Coding Standard"; pp. 560-576; Jul. 2003.
IEEE 0-7803-7724-9/03; C. Gomila et al.; "New Features and Applications of the H.264 Video Coding Standard"; pp. 6-10; International Conference on Information Technology, Aug. 11-13, 2003.
Search Report for Taiwanese Application No. 94129872 dated Feb. 23, 2013.
Office Action from Chinese Patent Application No. 200580034316.1 dated Oct. 8, 2014.
Office Action from corresponding Indian Patent Application No. 2046/DELNP/2007, dated Jul. 17, 2014.
Extended Search Report from European Patent Application No. 05786346.6, dated Sep. 16, 2010.
International Search Report and Written Opinion from International Application No. PCT/IB2005/002559, dated Feb. 14, 2006.
Search Report for Chinese Application No. 200580034316.1 dated Apr. 3, 2015, 1 page.
Wenger, S. et al., *RPT Payload Format for JVT Video*, JCT-VC Meeting, 96. MPEG Meeting; Mar. 16, 2011, Joint Collaborative Team on Video Coding of ISO/IEC JTCI/SC29/WG11 and ITU-T SG.16, IETF, CH, No. 1 (Jun. 1, 2002) 18 pages.
Wenger, S. et al., *Removal of the Picture Layer*, Joint Video Team (JVT) of ISO/IEC MPEG & ITU-T VCEG, JVT-D066 (Jul. 26, 2002) 9 pages.
Office Action for European Application No. 05 786 346.6 dated Jul. 26, 2016.

\* cited by examiner

```
A bitstream:  parameter set#0 + parameter set#1 + ... + sequence#0 + sequence#1
              + ...
A sequence :  picture#0 + picture#1 + ...
A picture  :  slice#0 + slice#1 + ...
A slice    :  slice header + MB#0 + MB#1 + ...
```

FIG. 1

```
A bitstream:  parameter set#0 + parameter set#1 + ... + sequence#0 + sequence#1
              + ...
A sequence :  picture#0 + picture#1 + ...
A picture  :  picture header + slice#0 + slice#1 + ...
A slice    :  slice header + MB#0 + MB#1 + ...
```

FIG. 3

```
pic_parameter_set_id, average 3 bits (assume values 0, 1, 2 are used mostly)
frame_num, 8 bits (assume MAX_FN = 256)
field_pic_flag, 1 bit
bottom_field_flag, 1 bit
idr_pic_id, only for IDR picture, average 0 bit
pic_order_cnt_lsb, 0 bit (assume pic_order_cnt_type is not equal to 0)
delta_pic_order_cnt_bottom, 0 bit (assume pic_order_cnt_type is not equal to 0)
delta_pic_order_cnt[ 0 ], average 1 bit
delta_pic_order_cnt[ 1 ], average 1 bit
non_ref_pic_reset_flag, only for IDR picture, average 0 bit
sp_for_switch_flag, only for SP picture, average 0 bit
slice_group_change_cycle, only for changing slice group types, average 0 bit
dec_pic_buffer_management(), at least 1 bit
```

FIG. 2

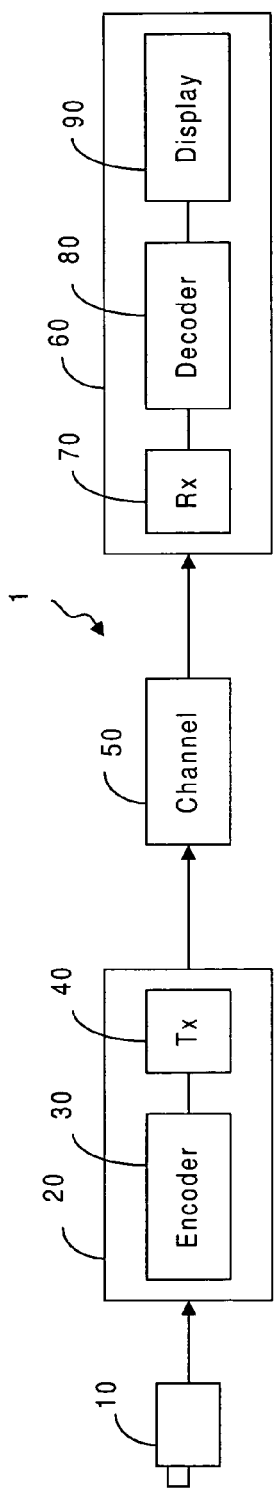
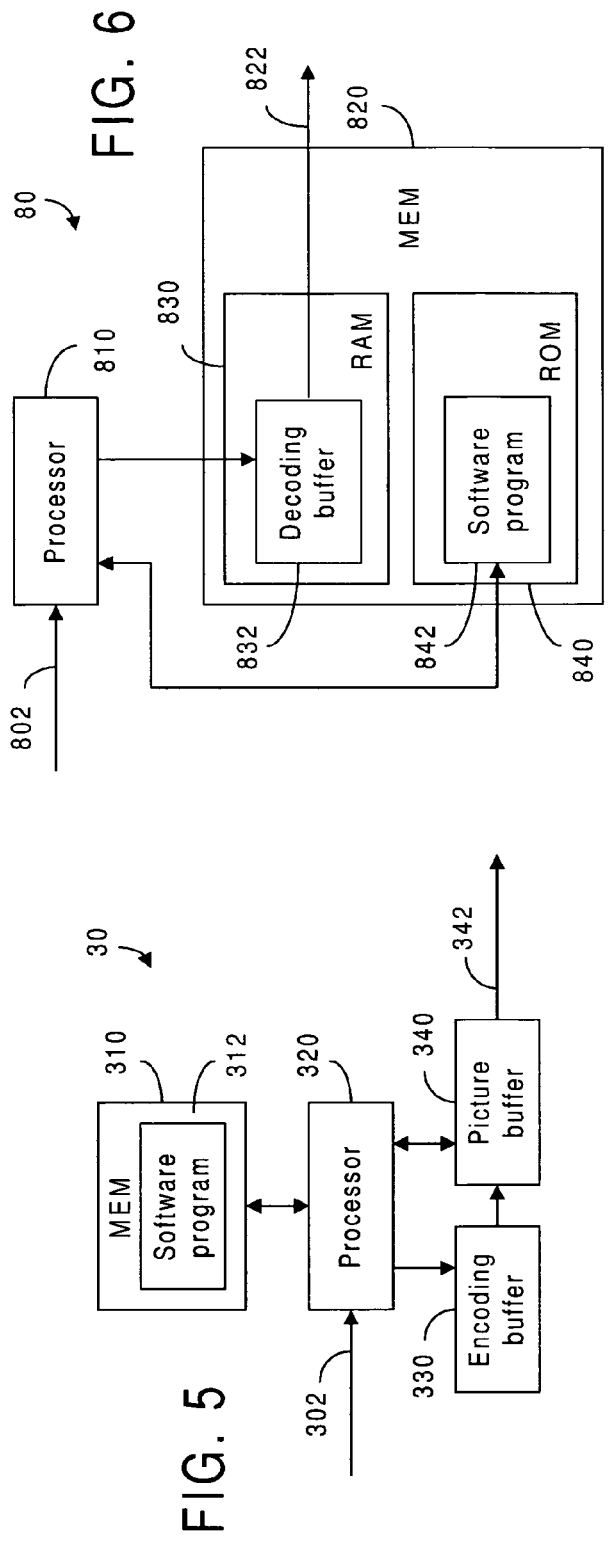
FIG. 4
FIG. 5
FIG. 6

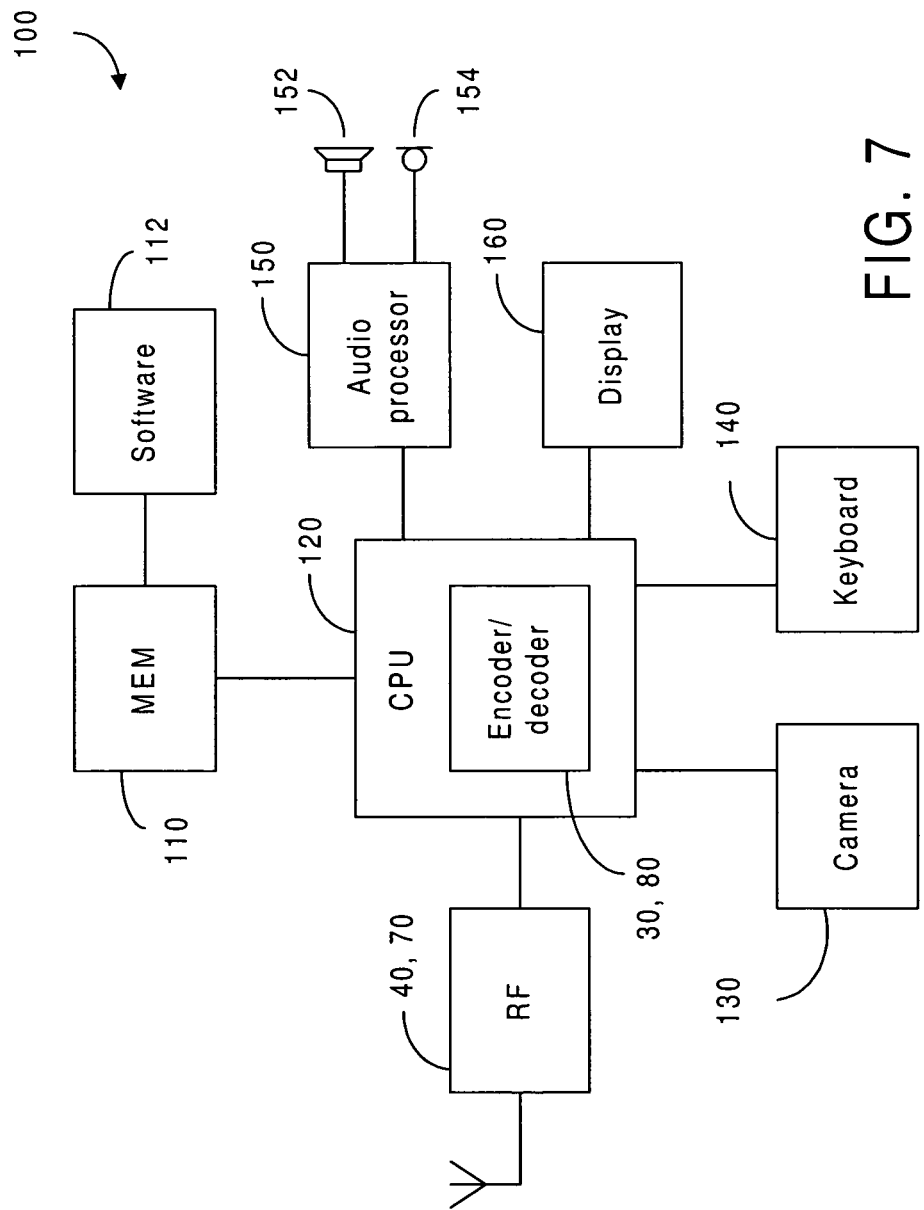

A bitstream : parameter set#0 + parameter set#1 + ... + sequence#0 + sequence#1 + ...

A sequence : picture#0 + picture#1 + ...

A picture : picture header + slice#0 + slice#1 + ...

A slice : slice header + MB#0 + MB#1 + ...

A slice header: [picture header parameers +] slice header parameters

FIG. 8a

A bitstream : parameter set#0 + parameter set#1 + ... + sequence#0 + sequence#1 + ...

A sequence : picture#0 + picture#1 + ...

A picture : slice#0 + slice#1 + ...

A slice : slice header + MB#0 + MB#1 + ...

A slice header: [picture header parameers +] slice header parameters

FIG. 8b

PARAMETER SET AND PICTURE HEADER IN VIDEO CODING

FIELD OF THE INVENTION

The present invention relates generally to video coding and, more particularly, to a video bitstream structure.

BACKGROUND OF THE INVENTION

Established video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 or ISO/IEC MPEG-4 AVC. H.264/AVC is the work output of a Joint Video Team (JVT) of ITU-T Video Coding Experts Group (VCEG) and ISO/IEC MPEG.

In addition, there are efforts working towards new video coding standards. One is the development of scalable video coding (SVC) standard in MPEG. The second effort is the development of China video coding standards organized by the China Audio Visual coding Standard Work Group (AVS). AVS finalized its first video coding specification, AVS 1.0 targeted for SDTV and HDTV applications, in February 2004. Since then the focus has moved to mobile video services. The resulting two standards AVS-M Stage 1 and AVS-M Stage 2 are scheduled to be published in December 2004 and April 2006, respectively.

Earlier video coding standards than H.264/AVC have specified a structure for an elementary bitstream, i.e., a self-containing bitstream that decoders can parse. The bitstream consists of several layers, typically including several of the following: a sequence layer, a picture layer, a slice layer, a macroblock layer, and a block layer. The bitstream for each layer typically consists of a header and associated data. Each header of a slice or higher layer starts with a start code for resynchronization and identification. This structure, which comprises a plurality of routines and sub-routines, is called the start code based bitstream structure.

The start code based bitstream structure can be depicted in a number of tables as follows (for simplicity, user data and extension data of sequence-level and picture-level are not included):

```
video_bitstream( ) {
    next_start_code( )
    do {
        sequence_header( )
        do {
            picture_header( )
            do {
                slice_header( )
                slice_data( )
                next_start_code( )
            } while( the following is a slice start code )
        } while( the following is a picture start code )
    } while( the following is not a bitstream end code )
}
sequence_header( ) {
    sequence_start_code
    sequence_header_parameter#1
    sequence_header_parameter#2
    ...
    next_start_code( )
}
picture_header( ) {
    picture_start_code
    picture_header_parameter#1
    picture_header_parameter#2
    ...
    next_start_code( )
```
-continued
```
}
slice_header( ) {
    slice_start_code
    slice_header_parameter#1
    slice_header_parameter#2
    ...
}
```

As can be seen in the above tables, the video_bitstream ( ) routine contains a plurality of sub-routines such as next_start_code ( ), sequence_header ( ). The table for each of such sub-routines contains a plurality of codes, such as start code and a number of parameters. The next_start_code ( ) sub-routine in video_bitstream ( ) routine advances the bitstream pointer until the next start code. The sequence end code (not shown) is also a type of start code. The slice_data ( ) sub-routine (not shown as a table) contains the coded video data of a slice except the slice header.

The syntax for H.264/AVC consists of Network Abstraction Layer (NAL) units. The coded video data is organized into NAL units. Each of the NAL units is effectively a packet that contains an integer number of bytes. The first byte of each NAL unit is a header byte that contains an indication of the type of data in the NAL unit, and the remaining bytes contain payload data of the type indicated by the header. The NAL unit structure definition specifies a generic format for use in both packet-oriented and bitstream-oriented transport systems. A series of NAL units generated by an encoder is referred to as a NAL unit stream. A stream of NAL units does not form an elementary bitstream as such, because there are no start codes in NAL units. Rather, when an elementary bitstream structure is required, NAL units have to be framed with start codes according to Annex B of the H.264/AVC specification to form an elementary bitstream.

H.264/AVC contains headers at slice layer and below, but it does not include picture and sequence headers. Instead, headers are replaced by one or more parameter sets. The parameter set design is used to provide for robust and efficient conveyance of header information. As the loss of a few key bits of header information (such as sequence header or picture header information) could have a severe negative impact on the decoding process, this key information could be separated for handling in a more flexible and specialized manner by using the parameter set design.

A parameter set is supposed to contain information that is expected to change rarely and offers the decoding of a large number of slices. There are two types of such parameter sets:
1) sequence parameter sets, which apply to a series of consecutive coded video pictures called a coded video sequence; and
2) picture parameter sets, which apply to the decoding of one or more individual pictures within a coded video sequence.

The sequence and picture parameter-set mechanism decouples the transmission of infrequently changing information from the transmission of coded representations of the values of the samples in the video pictures. Each slice contains an identifier that refers to the content of the relevant picture parameter set and each picture parameter set contains an identifier that refers to the content of the relevant sequence parameter set. In this manner, a small amount of data (the identifier) can be used to refer to a larger amount of information (the parameter set) without repeating that information within each slice. Sequence and picture parameter sets can be sent well ahead of other NAL units that they apply to, and can be repeated to provide robustness against data loss. In some applications, parameter sets may be sent within the channel that carries other NAL units (termed "in-band" transmission). In other applications, it can be advantageous to convey the parameter sets "out-of-band" using a more reliable transport mechanism than the video channel itself.

The bitstream structure of H.264/AVC is called the NAL unit plus parameter set bitstream structure. Note that if H.264/AVC Annex B is used, then the bitstream structure can be considered as a start code plus parameter set bitstream structure, because the concatenation of the start code prefix of H.264/AVC Annex B and the first byte of NAL unit can be defined as a start code.

The NAL unit plus parameter set bitstream structure is a concatenation of a number of NAL units, including the sequence parameter set NAL unit, picture parameter set NAL unit and slice NAL unit, as shown below:

```
sequence_parameter_set_NAL_unit( ) {
    nal_unit_header
    sequence_parameter_set_id
    sequence_parameter#1
    sequence_parameter#2
    ...
}
picture_parameter_set_NAL_unit( ) {
    nal_unit_header
    picture_parameter_set_id
    sequence_parameter_set_id
    picture_parameter#1
    picture_parameter#2
    ...
}
slice_NAL_unit( ) {
    nal_unit_header
    slice_header( )
    slice_data( )
}
slice_header( ) {
    picture_parameter_set_id
    slice_header_parameter#1
    slice_header_parameter#2
    ...
}
```

In the above tables, the nal_unit_header code indicates the type of a NAL unit, among other things.

The start code plus parameter set bitstream structure can be depicted as follows:

```
video_bitstream( ) {
    next_start_code( )
    do {
        if( the following is a sequence parameter set start code ) {
            sequence_parameter_set( )
        }
        if( the following is a picture parameter set start code ) {
            picture_parameter_set( )
        }
        if( the following is a slice start code ) {
            slice_header( )
            slice_data( )
            next_start_code( )
        }
    } while( the following is not a bitstream end code )
}
sequence_parameter_set( ) {
    sequence_parameter_set_start_code
    sequence_parameter_set_id
    sequence_parameter#1
```

-continued

```
    sequence_parameter#2
    ...
    next_start_code( )
}
picture_parameter_set( ) {
    picture_parameter_set_start_code
    picture_parameter_set_id
    sequence_parameter_set_id
    picture_parameter#1
    picture_parameter#2
    ...
    next_start_code( )
}
slice_header( ) {
    slice_start_code
    picture_parameter_set_id
    slice_header_parameter#1
    slice_header_parameter#2
    ...
}
```

In the above tables, the sequence_parameter_set_id code identifies a sequence parameter set from any other sequence parameter set. The picture_parameter_set_id code identifies a picture parameter set from any other picture parameter set.

Compared to the start code based structure, the sequence header and picture header sub-routines are useless in the start code plus parameter set structure. For this reason, the sequence header and picture header sub-routines are excluded from the start code plus parameter set structure. AVS Video 1.0 has adopted the start code based bitstream structure. It is so far not clear whether the start code based bitstream structure or the structure with NAL unit plus parameter set will be used for AVS-M and MPEG-21 SVC coding standards.

In the start code based bitstream structure, such as the bitstream structures in coding standards earlier than H.264/AVC, the parameter set technique is not used. Thus, infrequently changing information that remains unchanged has to be repeatedly signaled for each sequence in the sequence header or each picture in the picture header. This is wasteful from compression efficiency point of view. Further, without using the parameter set technique, transmission of infrequently changing information is difficult to be decoupled from transmission of other information. This makes the coded data more vulnerable to transmission errors, as the loss of a few key bits of infrequently changing information in the sequence or picture header could have a severe negative impact on the decoding process.

In the NAL unit plus parameter set bitstream structure and the start code plus parameter set bitsteam structure, there are no picture headers. Some information that remains unchanged for a picture has to be repeated in each slice header. This is also wasteful from compression efficiency point of view. Particularly, for H.264/AVC, as can be seen below, such information can take about 2% of the total bit rate in a conservative estimate.

The conventional parameter set based structure in a layer hierarchy (whether plus NAL unit or start code) is shown in FIG. 1.

The parameters in H.264/AVC slice header include those can change from slice to slice throughout the picture as well as those remain unchanged throughout the picture. FIG. 2 shows the parameters in the slice header that do not change throughout the picture with an estimate of how many bits each parameter uses. The estimation gives the result of 16 bits per slice. For a CIF (Common Intermediate Format) picture, with a slicing method of one macroblock row per slice, there are 18 rows per frame. That gives 18×16=288 bits/frame. At 30 frames per second, this becomes 8640 bits/sec, which is 2.3% of 384 kbps total bit rate. For mobile video telephony, it is reasonable to assume that a QCIF (Quarter CIF) picture has 100 bytes per slice to be conveyed at 64 kbps. This is equivalent to 80 slices/sec. With 16 bits per slice, the transmission rate is 80×16=1280 bits/sec or 2.0% of the total bit rate at 384 kbps.

SUMMARY OF THE INVENTION

In order to improve the compression efficiency in video coding, the present invention provides a picture header in the picture layer before the slices. Alternatively, picture header parameters are optionally included in the slice header whether or not the picture header is provided in the picture layer. Furthermore, picture header parameters can be included in one or more slices.

In prior art, picture header parameters are included in the slice header. In contrast, according to the present invention: picture header parameters are included
  in a picture header; or
  in a picture header, and optionally in each of the slice headers indicated by a flag; or
  in at least one slice header, and optionally in each of the other slice headers indicated by a flag.

BRIEF DESCRIPTION OF THE DRAWINGS

FIG. 1 shows a conventional parameter set based structure in a video bitstream.

FIG. 2 is a list of parameters in a prior art H.264/AVC slice header.

FIG. 3 shows a parameter set based structure in a video bitstream, according to the present invention.

FIG. 4 is a block diagram showing a video coding system, according to the present invention.

FIG. 5 is a block diagram showing a video encoder, according to the present invention.

FIG. 6 is a block diagram showing a video decoder, according to the present invention.

FIG. 7 is a block diagram showing an electronic device having a video coding system, according to the present invention.

FIG. 8a shows a parameter set based structure in a video bitstream, according to another embodiment of the present invention.

FIG. 8b shows a parameter set based structure in a video bitstream, according to yet another embodiment of the present invention.

DETAILED DESCRIPTION OF THE INVENTION

The present invention can be implemented in two embodiments. The first embodiment is related to the start code based bitstream structure, whereas the second embodiment is related to the NAL unit plus parameter set bitstream.

First Embodiment

The first embodiment of the present invention uses the parameter set and the picture header sub-routines simultaneously in the start code based bitstream structure.

To support the two types of parameter set sub-routines: the sequence parameter set sub-routine and the picture parameter set sub-routine, two unique start codes are used: sequence parameter set start code and picture parameter set start code. Each of these start codes must be different from any other start code, including the bitstream end code.

The first embodiment of the present invention is depicted as follows:

```
video_bitstream( ) {
    next_start_code( )
    do {
        if( the following is a sequence parameter set start code ) {
            sequence_parameter_set( )
        }
        if( the following is a picture parameter set start code ) {
            picture_parameter_set( )
        }
        if( the following is a picture start code ) {
            picture_header( )
            do {
                slice_header( )
                slice_data( )
                next_start_code( )
            } while( the following is a slice start code )
        }
    } while( the following is not a bitstream end code )
}
sequence_parameter_set( ) {
    sequence_parameter_set_start_code
    sequence_parameter_set_id
    sequence_parameter#1
    sequence_parameter#2
    ...
    next_start_code( )
}
picture_parameter_set( ) {
    picture_parameter_set_start_code
    picture_parameter_set_id
    sequence_parameter_set_id
    picture_parameter#1
    picture_parameter#2
    ...
    next_start_code( )
}
picture_header( ) {
    picture_start_code
    picture_parameter_set_id
    picture_header_parameter#1
    picture_header_parameter#2
    ...
    next_start_code( )
}
slice_header( ) {
    slice_start_code
    picture_parameter_set_id
    slice_header_parameter#1
    slice_header_parameter#2
    ...
    next_start_code( )
}
```

According to the first embodiment:

1) It is also possible to allow in the above tables the presence of at least one sequence parameter set or picture parameter set before a slice header.

2) The information in picture header (picture_header_parameter#1, #2, . . . ) is unchanged for decoding of the entire picture, and changes relatively frequently (e.g. to be changed for each picture) compared to the information in picture parameter set (picture_parameter#1, #2, . . . ).

3) The picture_parameter_set_id code is included in both the picture header and the slice header. However, it is also possible to exclude the picture_parameter_set_id code from the picture header if parsing of picture header parameters does not need the information in the picture parameter set. It is also possible to exclude the picture_parameter_set_id code from the slice header if all the slices in a picture must use the same picture parameter set.

4) Sequence header is not present because all the information that should be in the sequence header is already contained in the sequence parameter set. However, it is also possible to allow the presence of a sequence header to contain some sequence level parameters that are changed relatively frequently (e.g. to be changed for each sequence). If the sequence header is present, the sequence start code is needed as the first parameter in the sequence header. In this case, it is also possible to allow the presence of at least one sequence parameter set or picture parameter set before a picture header.

Second Embodiment

The second embodiment of the present invention uses the parameter set sub-routine and the picture header sub-routine simultaneously in the NAL unit plus parameter set bitstream structure. The simultaneous use of the parameter set sub-routine and the picture header sub-routine in the start code plus parameter set bitstream structure can be achieved by employing an H.264/AVC Annex B or similar coder, according to the second embodiment of the present invention.

To realize the second embodiment of the current invention, a new NAL unit type for the picture header is needed. This new picture header table is placed before the slice header table as shown below:

```
sequence_parameter_set_NAL_unit( ) {
    nal_unit_header
    sequence_parameter_set_id
    sequence_parameter#1
    sequence_parameter#2
    ...
}
picture_parameter_set_NAL_unit( ) {
    nal_unit_header
    picture_parameter_set_id
    sequence_parameter_set_id
    picture_parameter#1
    picture_parameter#2
    ...
}
picture_header_NAL_unit ( ) {
    nal_unit_header
    picture_parameter_set_id
    picture_header_parameter#1
    picture_header_parameter#2
    ...
}
slice_NAL_unit( ) {
    nal_unit_header
    slice_header( )
    slice_data( )
}
slice_header( ) {
    picture_parameter_set_id
    slice_header_parameter#1
    slice_header_parameter#2
    ...
}
```

According to the second embodiment of the present invention:

1) The picture header NAL unit precedes all the slice NAL units belonging to the same picture.

2) The picture header information (picture_header_parameter#1, #2, . . . ) is unchanged during the decoding of the entire picture, and changes relatively frequently (e.g. to be changed for each picture) compared to the information in the picture parameter set (picture_parameter#1, #2, . . . ).

3) It is also possible to optionally include the picture header information in a slice in order to improve error resilience if the picture NAL unit is subject to transmission errors.

4) The picture_parameter_set_id code is included in both the picture header and the slice header. However, it is also possible to exclude the picture_parameter_set_id code from the picture header if parsing of picture header parameters does not need the information in the picture parameter set. It is also possible to exclude the picture_parameter_set_id code from the slice header if all the slices in a picture must use the same picture parameter set.

5) The sequence header is not present because all the information that should be in sequence header is already contained in the sequence parameter set. However, it is also possible to allow the presence of a sequence header containing some sequence level parameters that are considered to be changed relatively frequently (e.g. to be changed for each sequence). If the sequence header is present, another NAL unit type for the sequence header is needed.

According to the second embodiment of the present invention, it is possible to optionally include the picture header information (picture_header_parameter#1, #2, . . . ) in each slice header instead of having picture header NAL units.

In sum, in the video coding method, according to the present invention, one or more parameter set sub-routines are used simultaneously with the picture header sub-routine in the bitstream structure. The bitstream structure can be a start code based bitstream structure or a NAL unit plus parameter set bitstream structure. If the bitstream is a start code based bitstream structure, one or more parameter set start codes are used to support the respective parameter set routines. If the bitstream is a NAL unit plus parameter set bitstream structure, a new NAL unit for the picture header is needed and/or the picture header parameters can be optionally included in a slice header. The new picture header is used together with other NAL units but prior to any slice NAL unit in the same picture. The parameter set based structure, whether based on start codes or NAL units, is shown in FIG. 3 according to the layer hierarchy in a video bitstream. In contrast to the conventional parameter set based structure as shown in FIG. 1, picture header is present in the picture layer, according to the present invention. In FIG. 1 and FIG. 3, MB stands for microblock.

The method of video coding, according to the present invention, can be implemented in a video coding system, as shown in FIG. 4. As shown in FIG. 4, the video coding system 1 comprises a transmitting device 20 having an encoder 30 operatively connected to a transmitter 40. The encoder 30 receives pictures to be encoded in a video stream from a video source 10, such as a camera, a video recorder, etc. The pictures (frames) of the video stream can be divided into smaller portions such as slices. The slices can further be divided into macroblocks (MBs) or blocks. The encoder 30 selects proper parameter sets for use with the encoding process and provides the selected parameter sets to the decoder 80 via a transmitter 40, through a channel 50 and a receiver 70. The decoder 80, as shown in FIG. 4, is part of a receiver system, which also includes a display device 90. The video data sent to the decoder is in a form of bitstream having a plurality of structural layers including a sequence layer, a picture layer and a slice layer in a layer hierarchy. The bitstream has a parameter set based structure, which includes the selected parameter sets. The parameter set based structure also includes a plurality of sub-structures representative of the structural layers, wherein one of the structural layers is representative of a picture in the picture layer. According to the present invention, the structural layer representative of a picture in the picture layer comprises a plurality of slices in the slice layer, and a picture header in the picture layer preceding the plurality of slices. After the video data in the bitstream is decoded, the decoded video data can be displayed on the display device 90.

The encoder 30 has an encoding buffer 330, as shown in FIG. 5, for temporarily storing some of the pictures to be encoded. The encoder 30 also includes a memory 310 and a processor 320, which receives the original video sequence 302 to be encoded. The memory 310 includes a software program 312 having executable codes for generating the parameter sets and the picture header to be included in the picture layer. The processor 320 carries out the encoding task according to the present invention. The memory 310 and the processor 320 can be common with or operatively connected to the transmitting device 30. From the encoding process carried out by the processor 320, the encoded pictures are moved to an encoded picture buffer 340, if necessary. The encoded pictures 342 are transmitted from the encoder 30 to the decoder 80.

In the receive side, as shown in FIG. 6, encoded pictures 802 received in a processor 810 are decoded to form uncompressed pictures corresponding as much as possible to the encoded pictures. The decoded picture can be buffered in the decoding buffer 832 in a RAM 830, which is part of a memory device 820. The decoder 80 also includes a software program 842 embedded in a ROM 840 for using the parameter sets and the picture header in the picture layer in the decoding process carried out by the processor 810.

The encoder 30 and the decoder 80, according to the present invention, can be used in an electronic device, such as a mobile terminal. As shown in FIG. 7, the electronic device 100 has a CPU 120 for data and signal processing. The CPU 120 includes an encoder 30 and a decoder 80, operatively connected to a RF front-end for receiving video data from one or more network components in a communications network, and for transmitting video data to one or more network components in the communications network. The electronic device 100 may include a camera 130 for providing pictures to be encoded, and a display 160 for displayed decoded pictures. The memory device 110, as shown in FIG. 7, can be used for picture buffer and encoding buffer. The software 112 can include the encoder software program 312 (see FIG. 5) and the decoder software program 842 (see FIG. 6). The electronic device may also include an audio output device 152 and an audio input device 154, operatively connected to the CPU 120 through an audio processor 150. The software 112 can be embedded in a storage medium in a chipset, for example.

It should be noted that the present invention can be extended to any start code based bitstream structure by introducing one or more parameter sets in the structure while keeping the picture header. According to the present invention, two parameter sets are used: sequence parameter set and picture parameter set. However, the number of parameter sets is not necessarily to be two. In general, the number of parameter sets is N, wherein N is a positive integer. For example, an additional set, such as slice parameter set, can also be used.

Regarding the parameter set based structure in a video bitstream as shown in FIG. 3, it is possible to optionally include picture header parameters in one or more slice headers of the picture, as shown in FIG. 8a. Moreover, it is also possible to include the picture header parameters in at least one slice header and optionally in the other slice headers indicated by a flag, as shown in FIG. 8b.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A method, comprising:
    encoding a video signal into a bitstream, the video signal comprising a sequence of pictures, the bitstream comprising a plurality of layers including a sequence layer, a picture layer, and a slice layer in a layer hierarchy; and
    providing in the bitstream, a picture header associated with the picture layer, a slice header associated with the slice layer, a sequence parameter set associated with the sequence layer, and a picture parameter set associated with one or more pictures in the picture layer, wherein the picture header associated with the picture layer precedes the slice header associated with the slice layer, wherein the picture header comprises an identifier referencing the picture parameter set, and wherein the picture header parameters are included in a slice header, and wherein a flag is provided in any other one or more slice headers when the picture header parameters are used in corresponding one or more slices.

2. The method of claim 1, wherein each of the slice header, the sequence parameter set, and the picture parameter set includes a start code.

3. The method of claim 1, wherein the picture header, the slice header, the sequence parameter set and the picture parameter set are provided as network abstraction layer units, wherein each of the plurality of layers is identified with a different network abstraction layer unit type in a network abstraction layer unit header.

4. An encoder for encoding video comprising:
    a processor; and
    a memory including computer program codes, the computer program codes being configured to, when executed by the processor, cause the encoder to:
    encode a video signal into a bitstream, the video signal comprising a sequence of pictures, the bitstream comprising a plurality of layers including a sequence layer, a picture layer, and a slice layer in a layer hierarchy; and
    provide in the bitstream, a picture header associated with the picture layer, a slice header associated with the slice layer, a sequence parameter set associated with the sequence layer, and a picture parameter set associated with at least one picture, wherein the picture header associated with the picture layer precedes the slice header associated with the slice layer, wherein the encoder is further configured to provide an identifier referencing the picture parameter set in the picture header, and wherein the encoder is further configured to include the picture header parameters in a slice header, and to provide a flag in any other one or more slice headers when the picture header parameters are used in corresponding one or more slices.

5. An encoder of claim 4, wherein the encoder is further configured to provide a start code for the slice header, the sequence parameter set, and the picture parameter set.

6. An encoder of claim 4, wherein the encoder is further configured to provide the picture header, the slice header, the sequence parameter set and the picture parameter set are provided as network abstraction layer units, wherein each of the plurality of layers is identified with a different network abstraction layer unit type in a network abstraction layer unit header.

7. An apparatus comprising an encoder according to claim 4 and a transmitter for transmitting an encoded bitstream.

8. A method of decoding an encoded video bitstream, said method comprising:
 receiving from the bitstream, a sequence parameter set and a picture parameter set, wherein the video bitstream is indicative of an encoded video sequence of pictures and the bitstream comprises a plurality of layers, including a sequence layer, a picture layer, and a slice layer in a layer hierarchy; and
 receiving from the bitstream, a picture header associated with the picture layer, and a slice header associated with the slice layer, wherein the picture header associated with the picture layer precedes the slice header associated with the slice layer, wherein the picture header comprises an identifier referencing the picture parameter set, and wherein the picture header parameters are included in a slice header, and wherein a flag is provided in any other one or more slice headers when the picture header parameters are used in corresponding one or more slices.

9. The method of claim 8, wherein each of the slice header, the sequence parameter set, and the picture parameter set includes a start code.

10. The method of claim 8, wherein the picture header, the slice header, the sequence parameter set and the picture parameter set are provided as network abstraction layer units, wherein each of the plurality of layers is identified with a different network abstraction layer unit type in a network abstraction layer unit header.

11. A decoder for decoding an encoded video bitstream comprising:
 a processor; and
 a memory including computer program codes, the computer program codes being configured to, when executed by the processor, cause the decoder to:
 receive from the bitstream, a sequence parameter set and a picture parameter set, wherein the video bitstream is indicative of an encoded video sequence of pictures and the bitstream comprises a plurality of layers, including a sequence layer, a picture layer, and a slice layer in a layer hierarchy; and
 receive from the bitstream, a picture header associated with the picture layer, and a slice header associated with the slice layer, wherein the picture header associated with the picture layer precedes the slice header associated with the slice layer, wherein the decoder is further configured to receive an identifier referencing the picture parameter set in the picture header, and wherein the decoder is further configured to receive the picture header parameters from a slice header, and to determine whether a flag is provided in any other one or more slice headers in order to use the picture header parameters in corresponding one or mores slices.

12. The decoder of claim 11, wherein the decoder is further configured to retrieve a start code for the slice header, the sequence parameter set, and the picture parameter set.

13. The decoder of claim 11, wherein the decoder is further configured to receive the picture header, the slice header, the sequence parameter set and the picture parameter set are provided as network abstraction layer units, wherein each of the plurality of layers is identified with a different network abstraction layer unit type in a network abstraction layer unit header.

14. An apparatus comprising a decoder according to claim 11 and a receiver for receiving the encoded video bitstream.

15. A non-transitory computer-readable medium embedded therein a software program for use in video encoding, said software program comprising:
 program code for encoding a video signal into a bitstream, the video signal comprising a sequence of pictures, the bitstream comprising a plurality of layers including a sequence layer, a picture layer, and a slice layer in a layer hierarchy;
 program code for providing first information in a picture header associated with the picture layer;
 program code for providing second information in a slice header associated with the slice layer;
 program code for providing third information in a sequence parameter set associated with the sequence layer; and
 program code for providing fourth information in a picture parameter set associated with one or more pictures in the picture layer, wherein the picture header associated with the picture layer precedes the slice header associated with the slice layer, wherein the picture header comprises an identifier referencing the picture parameter set and wherein a slice header comprises the picture header parameters, and wherein a flag is provided in any other one or more slice headers when the picture parameters are used in corresponding one or more slices.

16. The computer-readable medium of claim 15, wherein each of the slice layer header, the sequence parameter set, and the picture parameter set includes a start code.

17. The computer-readable medium of claim 15, wherein the picture header, the slice header, the sequence parameter set and the picture parameter set are provided as network abstraction layer units, wherein each of the plurality of layers is identified with a different network abstraction layer unit type in a network abstraction layer unit header.

18. A non-transitory computer-readable medium embedded therein a software program for use in decoding an encoded video bitstream having a plurality of layers including a sequence layer, a picture layer, and a slice layer in a layer hierarchy, said software program comprising:
 program code for receiving from the encoded video bitstream first information in a picture header associated with the picture layer;
 program code for receiving second information in the slice header associated with the slice layer;
 program code for receiving third information in a sequence parameter set associated with the sequence layer; and
 program code for receiving fourth information in a picture parameter set associated with one or more pictures in the picture layer, wherein the picture header associated with the picture layer precedes the slice header associated with the slice layer, wherein the picture header comprises an identifier referencing the picture parameter set, and wherein a slice header comprises the picture header parameters, and wherein a flag is provided in any other one or more slice headers when the picture header parameters are used in corresponding one or more slices.

19. The computer-readable medium of claim 18, wherein each of the slice layer header, the sequence parameter set, and the picture parameter set includes a start code.

20. The computer-readable medium of claim 18, wherein the picture header, the slice header, the sequence parameter set and the picture parameter set are provided as network abstraction layer units, wherein each of the plurality of layers is identified with a different network abstraction layer unit type in a network abstraction layer unit header.

\* \* \* \* \*

UNITED STATES PATENT AND TRADEMARK OFFICE
CERTIFICATE OF CORRECTION

PATENT NO. : 9,560,367 B2  
APPLICATION NO. : 11/207610  
DATED : January 31, 2017  
INVENTOR(S) : Wang et al.

Page 1 of 1

It is certified that error appears in the above-identified patent and that said Letters Patent is hereby corrected as shown below:

In the Claims

Column 11,  
Line 60, "mores slices" should read --more slices--.

Column 12,  
Line 30, "picture parameters" should read --picture header parameters--.

Signed and Sealed this  
Seventeenth Day of October, 2017

Joseph Matal  
*Performing the Functions and Duties of the*  
*Under Secretary of Commerce for Intellectual Property and*  
*Director of the United States Patent and Trademark Office*